US012561010B2

(12) United States Patent
McDonald et al.

(10) Patent No.: US 12,561,010 B2
(45) Date of Patent: Feb. 24, 2026

(54) DEVICE ORIENTATION DETECTION

(71) Applicant: Nokia Technologies Oy, Espoo (FI)

(72) Inventors: Rory Andrew Bruce McDonald, Cambridge (GB); Christopher John Wright, London (GB); Harry Michael Cronin, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 370 days.

(21) Appl. No.: 18/369,886

(22) Filed: Sep. 19, 2023

(65) Prior Publication Data

US 2024/0104763 A1 Mar. 28, 2024

(30) Foreign Application Priority Data

Sep. 23, 2022 (EP) .................................... 22197327

(51) Int. Cl.
| | |
|---|---|
| *G06F 3/03* | (2006.01) |
| *G06F 3/01* | (2006.01) |
| *G06T 7/60* | (2017.01) |
| *G06T 7/70* | (2017.01) |
| *G06T 11/00* | (2006.01) |
| *G06T 19/00* | (2011.01) |

(52) U.S. Cl.
CPC ................ *G06F 3/03* (2013.01); *G06F 3/017* (2013.01); *G06T 7/60* (2013.01); *G06T 7/70* (2017.01); *G06T 11/00* (2013.01); *G06T 19/006* (2013.01)

(58) Field of Classification Search
CPC ... G06F 3/03; G06F 3/017; G06T 7/70; G06T 7/60; G06T 11/00; G06T 19/006

USPC .......................................................... 382/106
See application file for complete search history.

(56) References Cited

U.S. PATENT DOCUMENTS

| | | | | |
|---|---|---|---|---|
| 9,830,395 | B2 * | 11/2017 | Mullins ............... | G06F 16/9537 |
| 2019/0079302 | A1 * | 3/2019 | Ninan ..................... | G06F 3/011 |
| 2020/0066236 | A1 * | 2/2020 | Giusti ..................... | G06F 3/011 |
| 2023/0306213 | A1 * | 9/2023 | Hester .............. | G06K 19/07773 |
| 2024/0077953 | A1 * | 3/2024 | McDonald ............... | G09G 5/12 |

FOREIGN PATENT DOCUMENTS

FR          3107390 A1     8/2021

OTHER PUBLICATIONS

Li, Z. et al. "WaveSpy: Remote and Through-wall Screen Attack via mm Wave Sensing," 2020 IEEE Symposium on Security and Privacy, May 18, 2020, pp. 217-232.

* cited by examiner

*Primary Examiner* — Gabriel I Garcia
(74) *Attorney, Agent, or Firm* — McCarter & English LLP

(57) ABSTRACT

An apparatus, method and computer program is described comprising: detecting, at a second user device, one or more display patterns displayed at a display of a first user device, wherein the one or more display patterns comprise features with spatial variations configured to be detected by a radar module of the second user device; determining at least one of an orientation, position, or size of the first user device based, at least in part, on the one or more display patterns; and determining at least one of an orientation or position of the second user device relative to the first user device within a coordinate system of the first user device.

13 Claims, 7 Drawing Sheets

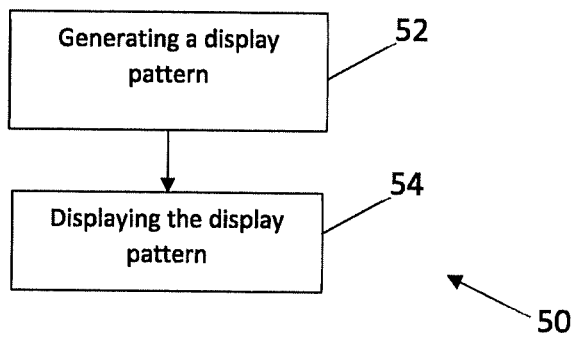
*FIG. 5*
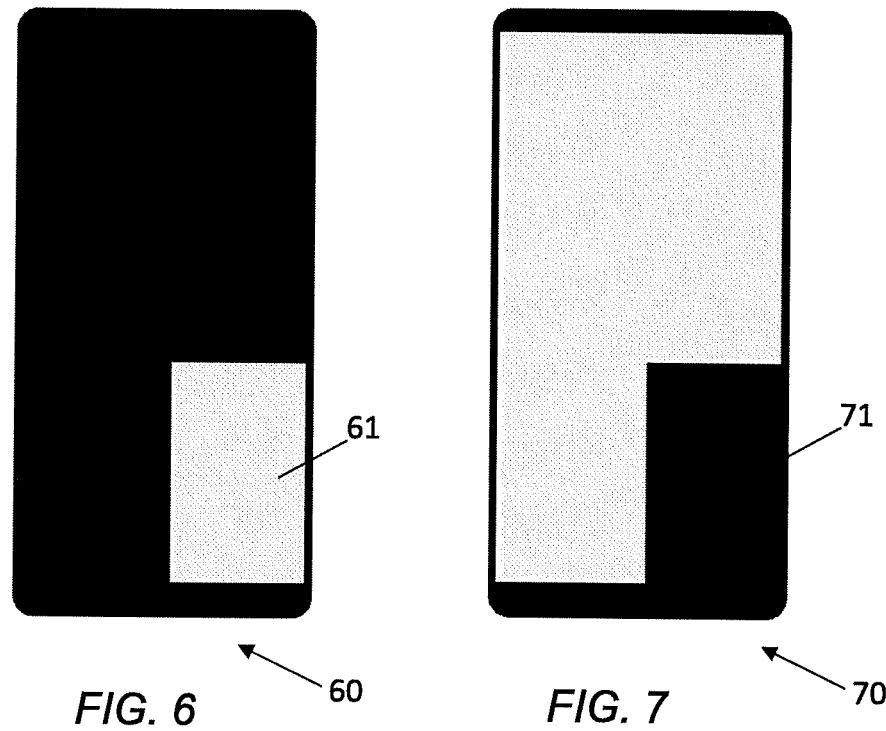
*FIG. 6*          *FIG. 7*

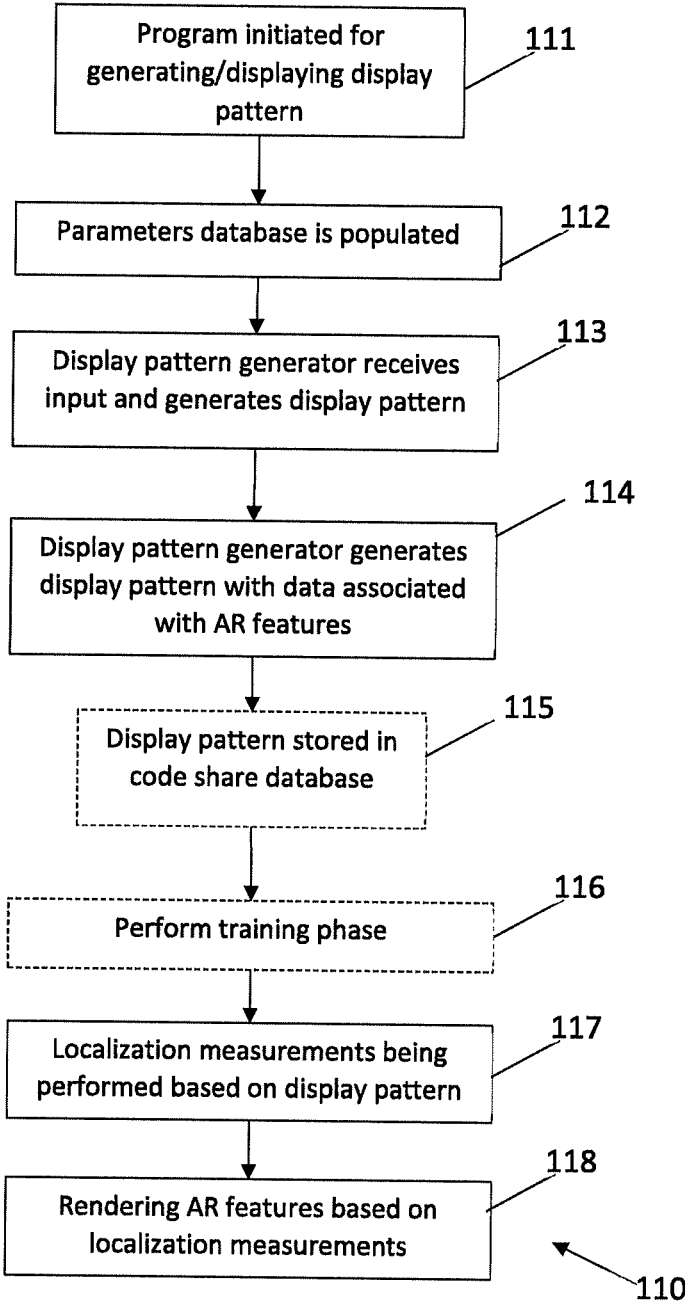

Program initiated for generating/displaying display pattern — 111

Parameters database is populated — 112

Display pattern generator receives input and generates display pattern — 113

Display pattern generator generates display pattern with data associated with AR features — 114

Display pattern stored in code share database — 115

Perform training phase — 116

Localization measurements being performed based on display pattern — 117

Rendering AR features based on localization measurements — 118

Memory

314    RAM 316
315

312    ROM

Network
Interface          308

Processor

302

User
Input

Display

318

310

365

367

366

DEVICE ORIENTATION DETECTION

FIELD

The present specification relates to detection of device features, such as orientation or position of the device.

BACKGROUND

Arrangements for determining one or more features of a device (such as orientation, position, size of a display of the device) within line of sight are known. There remains a need for further development in this field.

SUMMARY

In a first aspect, this specification describes an apparatus comprising means for performing: detecting, at a second user device, one or more display patterns displayed at a display of a first user device, wherein the one or more display patterns comprise features with spatial variations configured to be detected by a radar module of the second user device; determining at least one of an orientation, position, or size of the first user device based, at least in part, on the one or more display patterns; and determining at least one of an orientation or position of the second user device relative to the first user device within a coordinate system of the first user device.

Some example embodiments further comprise means for performing: configuring at least one of a position, orientation, or size of visual and/or audio data based, at least in part, on the determined orientation or position of the second user device relative to the first user device, wherein the one or more display patterns further comprise inertial data associated with the first user device. The apparatus may further comprise means for performing: rendering visual and/or audio data according to the configured position, orientation, or size.

The display pattern may comprise an encryption enabling the display pattern to be detectable by an authorized second user device. Alternatively, or in addition, the display pattern may comprise features associated with one or more virtual reality, augmented reality, or mixed reality features.

The display pattern may comprise one or more features relating to a geometry of the first user device. Said one or more features relating to the geometry of the first user device may relate to a three dimensional geometry of the first user device, such that the display pattern is detectable by the radar module of the second user device from one or more specified directions.

The display pattern may comprise at least one of: one or more predetermined shapes displayed in a non-symmetrical manner; one or more predetermined shapes displayed with a predetermined spatial pattern; or transitioning between a plurality of predetermined patterns.

In a second aspect, this specification describes an apparatus comprising means for performing: generating, at a first user device, a display pattern comprising features with spatial variations, wherein the spatial variations are configured to enable determination, by a radar module of a second user device, of at least one of an orientation, position, or size of a first user device.

The display pattern may comprise an encryption enabling the display pattern to be detectable by an authorized second user device. Alternatively, or in addition, the display pattern may comprise features associated with one or more virtual reality, augmented reality, or mixed reality features.

The display pattern may comprise one or more features relating to a geometry of the first user device. Said one or more features relating to the geometry of the first user device may relate to a three dimensional geometry of the first user device, such that the display pattern is detectable by the radar module of the second user device from one or more specified directions.

The display pattern may comprise at least one of: one or more predetermined shapes displayed in a non-symmetrical manner; one or more predetermined shapes displayed with a predetermined spatial pattern; or transitioning between a plurality of predetermined patterns.

In the first or second aspects, the said means may comprise: at least one processor; and at least one memory including computer program code, the at least one memory and the computer program configured, with the at least one processor, to cause the performance of the apparatus.

In a third aspect, this specification describes a system comprising: one or more first user devices and one or more second user devices. At least one of the one or more first user devices comprises means for performing: generating, at a respective first user device, a display pattern comprising features with spatial variations, wherein the spatial variations are configured to enable determination, by a radar module of one or more second user devices, of at least one of an orientation, position, or size of the respective first user device. At least one of the one or more second user devices comprises means for performing: detecting, at a respective second user device, one or more respective display patterns displayed at a display of at least one of the one or more first user devices, wherein the one or more respective display patterns comprise features with spatial variations configured to be detected by a radar module of the respective second user device; determining at least one of an orientation, position, or size of the respective first user device based, at least in part, on the respective one or more display patterns; and determining one or more of an orientation and position of the respective second user device relative to the respective first user device within a coordinate system of the respective first user device.

In some example embodiments, the one or more second user devices further comprise means for performing: configuring at least one of a position, orientation, or size of rendered visual and/or audio data based, at least in part, on the determined orientation and position of the second user device relative to the first user device, wherein the one or more display patterns further comprise inertial data associated with the first user device; and rendering visual and/or audio data according to the configured position, orientation or size.

In a fourth aspect, this specification describes a method comprising: detecting, at a second user device, one or more display patterns displayed at a display of a first user device, wherein the one or more display patterns comprise features with spatial variations configured to be detected by a radar module of the second user device; determining at least one of an orientation, position, or size of the first user device based, at least in part, on the one or more display patterns; and determining at least one of an orientation or position of the second user device relative to the first user device within a coordinate system of the first user device.

The method may further comprise: configuring at least one of a position, orientation, or size of visual and/or audio data based, at least in part, on the determined orientation or position of the second user device relative to the first user device, wherein the one or more display patterns further comprise inertial data associated with the first user device.

The method may further comprise: rendering visual and/or audio data according to the configured position, orientation, or size.

In a fifth aspect, this specification describes a method comprising: generating, at a first user device, a display pattern comprising features with spatial variations, wherein the spatial variations are configured to enable determination, by a radar module of a second user device, of at least one of an orientation, position, or size of a first user device.

In the fourth of fifth aspects, the display pattern may comprise an encryption enabling the display pattern to be detectable by an authorized second user device. Alternatively, or in addition, the display pattern may comprise features associated with one or more virtual reality, augmented reality, or mixed reality features.

In the fourth of fifth aspects, the display pattern may further comprise one or more features relating to a geometry of the first user device. Said one or more features relating to the geometry of the first user device may relate to a three dimensional geometry of the first user device, such that the display pattern is detectable by the radar module of the second user device from one or more specified directions.

In the fourth of fifth aspects, the display pattern may comprise at least one of: one or more predetermined shapes displayed in a non-symmetrical manner; one or more pre-determined shapes displayed with a predetermined spatial pattern; or transitioning between a plurality of predetermined patterns.

In a sixth aspect, this specification describes computer-readable instructions which, when executed by a computing apparatus, cause the computing apparatus to perform (at least) any method as described with reference to the fourth or fifth aspects.

In a seventh aspect, this specification describes a computer-readable medium (such as a non-transitory computer-readable medium) comprising program instructions stored thereon for performing (at least) any method as described with reference to the fourth or fifth aspects.

In an eighth aspect, this specification describes an apparatus comprising: at least one processor; and at least one memory including computer program code which, when executed by the at least one processor, causes the apparatus to perform (at least) any method as described with reference to the fourth or fifth aspects.

In a ninth aspect, this specification describes a computer program comprising instructions for causing an apparatus to perform at least the following: detecting, at a second user device, one or more display patterns displayed at a display of a first user device, wherein the one or more display patterns comprise features with spatial variations configured to be detected by a radar module of the second user device; determining at least one of an orientation, position, or size of the first user device based, at least in part, on the one or more display patterns; and determining at least one of an orientation or position of the second user device relative to the first user device within a coordinate system of the first user device.

In a tenth aspect, this specification describes a computer program comprising instructions for causing an apparatus to perform at least the following: generating, at a first user device, a display pattern comprising features with spatial variations, wherein the spatial variations are configured to enable determination, by a radar module of a second user device, of at least one of an orientation, position, or size of a first user device.

In an eleventh aspect, this specification describes: a radar module (or some other means) for detecting, at a second user device, one or more display patterns displayed at a display of a first user device, wherein the one or more display patterns comprise features with spatial variations configured to be detected by a radar module of the second user device; a processor (or some other means) for determining at least one of an orientation, position, or size of the first user device based, at least in part, on the one or more display patterns; and the processor (or some other means) for determining at least one of an orientation or position of the second user device relative to the first user device within a coordinate system of the first user device. Some example embodiments further comprise the processor (or some other means) for configuring at least one of a position, orientation, or size of visual and/or audio data based, at least in part, on the determined orientation or position of the second user device relative to the first user device, wherein the one or more display patterns further comprise inertial data associated with the first user device. Some example embodiments further comprise an augmented reality display (or some other means) for rendering visual and/or audio data according to the configured position, orientation, or size.

In a twelfth aspect, this specification describes a display pattern generating module (or some other means) for generating, at a first user device, a display pattern comprising features with spatial variations, wherein the spatial variations are configured to enable determination, by a radar module of a second user device, of at least one of an orientation, position, or size of a first user device. The generated display pattern may be displayed using a display of the first user device.

BRIEF DESCRIPTION OF THE DRAWINGS

Example embodiments will now be described, by way of example only, with reference to the following schematic drawings, in which:

FIG. 5 is a flowchart of an algorithm in accordance with an example embodiment;

FIGS. 6 and 7 are illustrations of a user device in accordance with example embodiments;

FIG. 11 is a flowchart of an algorithm in accordance with an example embodiment;

DETAILED DESCRIPTION

Figure 1:
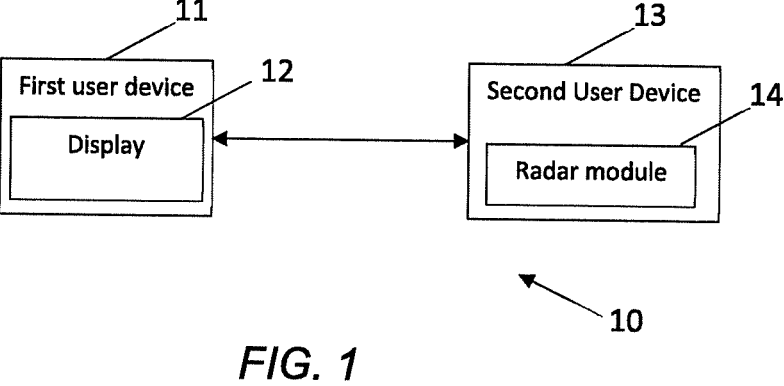
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. System 10 comprises a first user device 11, which first user device 11 comprises at least one display 12. System 10 further comprises a second user device 13. The second user device 13 may comprise a radar module 14, such that the second user device 13 has radar functionality (e.g. mmWave Frequency-modulated continuous-wave (FMCW) radar). The second user device 13 (e.g. an augmented reality (AR) device) may further comprise functionalities relating to augmented reality, virtual reality, and/or mixed reality, such that the second user device 13 may be suitable for rendering audio and/or visual content in augmented reality (AR), virtual reality (VR), and/or mixed reality (MR). In one example, the second user device 13 may be smart-glasses, such as AR, VR, or MR glasses.

In some example embodiments, content of display screens, such as organic light emitting diode (OLED) screens or liquid crystal display (LCD) screens, may be inferred remotely (e.g. non-line of sight, such as through walls) by radar devices, such as mmWave FMCW radar devices. For example, liquid crystal nematic patterns may act as an array of antennas, which may manipulate the reflected mmWave signals. The dielectric constant of liquid crystals may change depending on their alignment, and therefore their manipulation of reflected mmWave signals may change. Further, a state vector machine and K-nearest neighbour classifier may initially be applied to identify screen content based on temporal features of the reflected signals. A deep neural network may then be used for distinguishing spectral features and predict content features with comparatively greater accuracy. However, resolution of such radar devices (e.g. dependent on radar aperture) may not be sufficient to resolve a shape or orientation of a display.

In some examples, augmented reality features (e.g. audio and/or visual content), for example for augmented reality interactions between a user and a device (e.g. the second user device 13) and/or another user, may be rendered in inaccurate position(s) if a reference coordinate system (e.g. based on position or orientation) of a device (e.g. first user device 11) associated with a user is not established accurately. For example, AR content may be positioned incorrectly relative to real-life object(s), or positioning of AR content may be inconsistent between different users.

Existing techniques for accurate localization measurements of devices may be limited to devices within line-of-sight, or may be based on inertial measurement unit (IMU) based packets, which may not guarantee authenticity Example embodiments described below provide example techniques for allowing AR devices to perform accurate localization measurements of user devices and render audio-visual contents accordingly.

Figure 2:
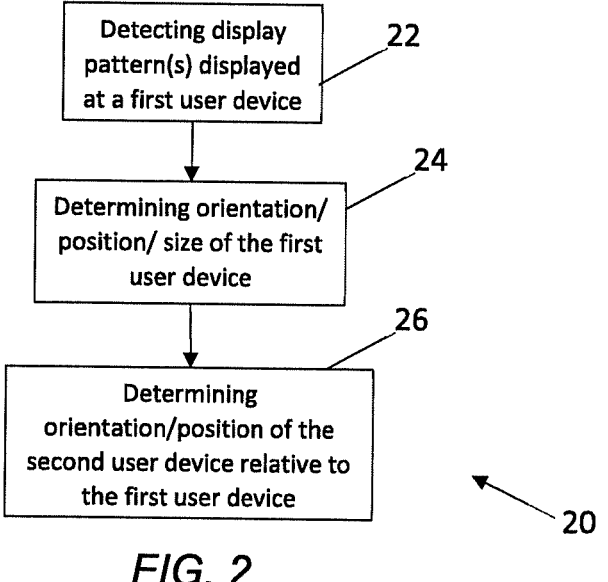
FIGS. 2 and 3 are flowcharts of algorithms in accordance with example embodiments.

FIG. 2 is a flowchart of an algorithm, indicated generally by the reference numeral 20, in accordance with an example embodiment. The algorithm 20 may be performed at a device (e.g. AR device), such as the second user device 13, having a radar module 14.

At operation 22, a display pattern displayed at a first user device, such as the first user device 11, may be detected by the radar module 14 of the second user device 13. The display pattern may be displayed at the display (e.g. LCD or OLED screen) of the first user device 11. The display pattern may comprise features with spatial variations, with the spatial variations being configured to enable determination, by the radar module 14, of at least one of: an orientation of a display of a user device, position of a display of the user device, size of a display of the user device, or one or more gestures associated with the user device. For example, determination of gesture(s) associated with the user device may comprise determination of a series of changes in one or more of the orientation and position of the display.

Next, at operation 24, one or more of the orientation, position, and size of the first user device 11 is determined based, at least in part, on the display pattern detected at operation 22. In one example, the determination may be based on a rule or a machine learning model.

At operation 26, one or more of an orientation or position of the second user device 13 is determined relative to the first user device within a coordinate system of the first user device 11. For example, once the second user device 13 performs self-localization relative to the first user device 11, the second user device 13 may be able to render audio-visual content (e.g. AR features, including gesture interactions associated with said AR features) in accurate positions such that a user may associate the audio-visual content with the first user device 11, as well as the user may engage with (e.g. view and/or hear) the audio-visual content in accurate positions relative to real life objects.

In an example embodiment, the display pattern comprises features associated with one or more virtual reality, augmented reality, or mixed reality features, for example, of audio-visual content rendered or to be rendered by the second user device 13. For example, the display pattern may contain data pertaining to the AR feature to be positioned. Alternatively, or in addition, the display pattern may comprise information that allows the second user device 13 to access information (e.g. data linking the radar module 14 of the second user device 13 to a database) relating to positioning and/or orientation of audio-visual content or other AR features to be rendered. Alternatively, or in addition, the display pattern may be associated with AR, VR or MR features such that the display pattern may be detectable or readable to any radar devices (such as the second user device 13) within the region in which the AR, VR, or MR features are to be rendered. The display pattern may be updated dynamically, for example, with an updating frequency that may be suitable to timely update AR, VR, or MR features to be rendered. The updating frequency may be dependent on the expected relative motion of the AR device (second user device 13) and the first user device 11 (e.g., a fast moving AR device may require more frequent display pattern updates).

Figure 3:
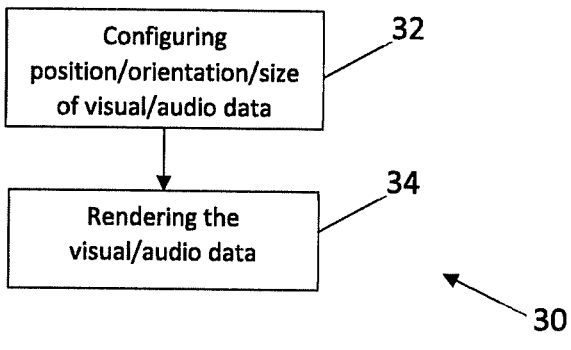

FIG. 3 is a flowchart of an algorithm, indicated generally by the reference numeral 30, in accordance with an example embodiment. The operations of algorithm 30 may be performed at the second user device 13 (e.g. AR device), for example, after performing the operations of algorithm 20 described with reference to FIG. 2.

At operation 32, one or more of a position, orientation, or size of a visual and/or audio data (e.g. audio-visual content to be rendered by the second user device 13) may be configured based, at least in part, on the orientation and/or position of the second user device 13 relative to the first user device 11 as determined at operation 26. In an example embodiment, the one or more display patterns comprise inertial data associated with the first user device 11. The inertial data may comprise inertial measurement unit (IMU) packets associated with the first user device 11 (or an indication thereof). Accordingly, the configuring of operation 32 may be based, at least partially on the inertial data associated with the first user device 11.

At operation 34, the visual and/or audio data may be rendered according to the configured position, orientation, and/or size. For example, the rendered visual and/or audio data may be positioned such that a user (e.g. user of the first user device 11 and/or second user device 13) may be able to experience (e.g. view and/or hear) and/or interact with the rendered data that is rendered at a convenient position and/or orientation, for example, based on the position and/or orientation of the first user device 11.

In one example, if a position and/or orientation of the first user device 11 is determined (e.g. at operation 24) to be occluded relative to the second user device 13 (e.g. the first user device 11 is in a user's bag or pocket, or is occluded by the user's limbs), the second user device 13 may detect the occlusion, and configure and render the visual and/or audio data at operations 32 and 34 respectively at a position and/or orientation that takes into account the occlusion, such that the user may still be able to experience (e.g. view and/or hear) and/or interact with the rendered data without any occlusions (e.g. AR features rendered within line of sight of the user, and close enough for the user to experience and/or interact with the AR features).

Figure 4:
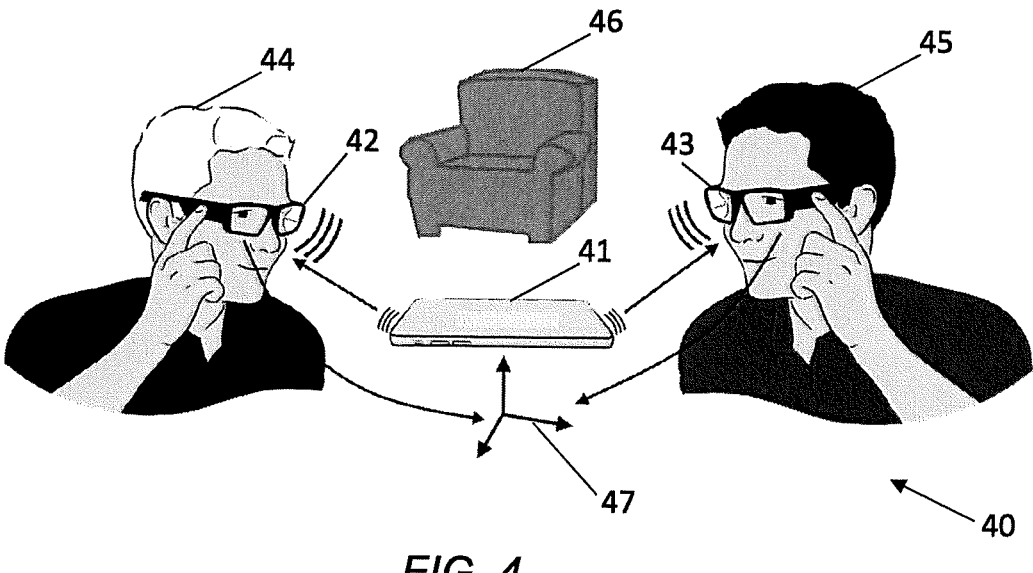
FIG. 4 is a block diagram of a system in accordance with an example embodiment.

FIG. 4 is a block diagram of a system, indicated generally by the reference numeral 40, in accordance with an example embodiment. The system 40 comprises a first user device 41 (e.g. similar to the first user device 11), a second user device 42 (e.g. similar to the second user device 13) worn by a first user 44, and a third user device 43 (e.g. similar to the second user device 13) worn by a second user 45. For example, the first user device 41 may be a smartphone and/or a smartwatch, and the second and third user devices 42 and 43 may be AR devices, such as smart glasses, with radar capabilities.

The operations of algorithms 20 and 30 may be performed at the second user device 42 and/or third user device 43, such that position and/or orientation of the second user device 42 and/or third user device 43 relative to the first user device 41 is determined. In one example, if only the second user device 42 determines the position and/or orientation of the first user device 41, the second user device 42 may convey the determined position and/or orientation of the first user device 41 to the third user device 43. Consequently, the second user device 42 may determine (operation 26) its own position and/or orientation relative to the first user device 41, and the third user device 43 may determine (operation 26) its own position and/or orientation relative to the first user device 41. Alternatively, or in addition, the second user device 42 may determine position and/or orientation of the third user device 43 relative to the first user device 41 (e.g. radar devices may be able to identify each other using mmWave or 5G antennas). The second user device 42 may then convey the determined relative position and/or orientation of the third user device 43 to the third user device 43. In one example embodiment, the detection of the display pattern and consequent determination of position and/or orientation of the first user device 41 may be performed regardless of whether the display of the first user device 41 is facing upward, downward, towards, or away from the second user device 42 or third user device 43.

As shown in the system 40, determination (operation 24) of the position and/or orientation of the first user device 41 may comprise determination of the co-ordinate system 47 of the first user device 41. Based on the determined position and/or orientation of the first user device 41, the orientation and/or position of the second user device 42 may be determined (operation 24) relative to the first user device 41 within the coordinate system 47 of the first user device 41. Consequently, the second user device 42 may configure a position and/or orientation for rendering the visual and/or audio data, such as the AR feature 46 within the co-ordinate system 47 of the first user device 41. As such, the user 44 may be able to experience (view, hear, and/or interact with) the AR feature 46 at a suitable position and/or orientation relative to the first user device 41. Similarly, based on the determined position and/or orientation of the first user device 41, the orientation and/or position of the third user device 43 may be determined (operation 24) relative to the first user device 41 within the coordinate system 47 of the first user device 41. Consequently, the third user device 43 may configure position and/or orientation for rendering the visual and/or audio data, such as the AR feature 46 within the co-ordinate system 47 of the first user device 41. As such, the user 45 may be able to experience (view, hear, and/or interact with) the AR feature 46 at a suitable position and/or orientation relative to the first user device 41.

In an example embodiment, the position and/or orientation of the AR feature 46 may be augmented or rendered based, at least partially, on inertial data (e.g. IMU packets) associated with the first user device 41. For example, data (or a link to the data) relating to the augmentation or rendering of the AR feature 46 may be included in the display pattern displayed at the first user device 41 and detected by the second user device 42 and/or third user device 43. Alternatively, or in addition, the inertial data (e.g. IMU packets) relating to the first user device 41 may be used for determining motion of the first user device 41 (e.g. motion of a body part of a user wearing, carrying or holding the first user device 41), such that the AR feature 46 is positioned and/or oriented dynamically based on the motion of the first user device 41. Alternatively, or in addition, inertial data (e.g. IMU packets) related to the first user device 41 may be used for determining motion for one or more other user devices (e.g. body area network device attached to the user's body) connected to the first user device 41 (e.g. connected via a body area network), such that the AR feature 46 is positioned and/or oriented dynamically based on the motion of the one or more other user devices (e.g. based on motion of the body part(s) of the user where the other user device(s) are attached).

As such, the position and/or orientation of the first user device 41 may act as a reference point for position and/or orientation for rendering AR features, such as the AR feature 46. For example, an AR feature may include virtual clothing, such that the virtual clothing AR feature may be rendered relative to the position, orientation, and/or motion of the user's body part(s), that may be determined based on the position, orientation and/or motion of the first user device 41.

FIG. 5 is a flowchart of an algorithm, indicated generally by the reference numeral 50, in accordance with an example embodiment. The operations of FIG. 5 may be performed at a first user device, such as the first user device 11 or 41. At operation 52, a display pattern is generated, at the user device (11, 41) having a display (e.g. LCD or OLED screen). The display pattern may be displayed at the display of the user device at operation 54. The display pattern may comprise features with spatial variations, with the spatial variations being configured to enable determination, by a radar module (e.g. radar module 14) of a second user device (e.g. second user device 11, second user device 42, third user device 43) of one or more of an orientation, position, or size of the first user device. In some example embodiments, the display pattern may also enable the radar module of the second user device to determine one or more gestures associated with the first user device. For example, determination of gesture(s) associated with the first user device may comprise determination of a change (e.g. series of changes) in one or more of the orientation or position of the first user device.

In an example embodiment, generating the display pattern at operation 52 may be based on one or more rules and/or may be based on a machine learning algorithm. For example, the display pattern generated may be based on one or more parameters associated with the second user device, so as to ensure that the radar module is able to determine an orientation or position of the user device based on the display pattern.

In an example embodiment, the display pattern may comprise one or more predetermined shapes (e.g. a rectangle of known ratio of width and length) displayed in a non-symmetrical manner. Alternatively, or in addition, the display pattern may comprise one or more predetermined shapes displayed with a predetermined spatial pattern. For example, a spatial pattern may be provided at at least a portion of the display, and one or more predetermined shapes (e.g. rectangle of known width and length, or the like) may be provided adjacent to, or overlapping, the spatial pattern.

Alternatively, or in addition, the display pattern may comprise spatial and temporal patterns, such that the display pattern comprises transitioning between a plurality of predetermined patterns, for example at a predetermined periodicity or frequency. In one example, the transitioning may comprise transitioning between a first display pattern and a second display pattern, where the first and second display patterns may have high relative contrasts. For example, the first and second display patterns may be inverse patterns of each other. Transitioning between inverted states may provide a discernible response or high signal-to-noise ratio response for detection by the radar module of the second user device (interchangeably referred to as a radar device). In another example, the transitioning may be from displaying a first display pattern periodically (e.g. in flashes) such that within intervals of displaying the first display pattern, no other display pattern is displayed. This may allow the second user device to perform a difference measurement (e.g. difference in display when the display pattern is displayed, and when the display pattern is not displayed), such that relevant spectral features of the display pattern may be determined.

In an example embodiment, the display pattern comprises a defined repeating spatial pattern (e.g., stripes with known spacing pattern) along a portion of the display. The display pattern may further comprise the repeating spatial pattern moving (e.g. gradually) in a predetermined direction, thus providing a spatial and temporal display pattern. The direction of movement may indicate a reference direction to the second user device.

In an example embodiment, the display pattern may comprise a grid of defined shapes on the display that may individually flash between a HIGH state (e.g. display pattern being displayed) and LOW state (e.g. display pattern not being displayed) at different intervals, thus encoding their position on the screen through their respective flash duty cycles or timings.

In an example embodiment, the display patterns may have a size that is sufficient for detection by the radar module 14. In one example embodiment, the minimal determinable length of a display pattern may be a dependent on the liquid crystal array dielectric constant (nominally 3.66), and the transmitted radar frequency (e.g. 30 GHz-300 GHz for mmWave radar). For example, within the mmWave band for the radar module, the minimum determinable length of display pattern features may range from 2.61 mm to 0.26 mm. In one example, increasing the size of display pattern (e.g. relative to the size of the display screen) may result in increases in the measured amplitude of the response by the second user device. In some examples, the increased amplitude may be useful, for example, if the display material reflection efficiency is relatively low (e.g. in some OLED display types), or if the expected distance and/or level of occlusion between the display and the external radar device(s) (e.g. second user devices) is large.

In one example, the display pattern features may be of predetermined size (or moving at a defined distance over time across the display) allowing their perceived size (or movement) at a distance to be used by the second user device(s) to infer the distance to the display.

In an example embodiment, the display pattern has a duration (e.g. for spatial and temporal patterns) that is sufficient for detection by the radar module 14. For example, the display patterns may be displayed for a sufficient number of display refreshes and/or the refresh rate may be lowered so as to allow the display pattern to be displayed for a sufficient duration. In one example, a display refresh rate of 10 Hz to 25 Hz may be sufficient for readability of the display pattern by the radar module(s). In one example, the display refresh rate may be configured based on a polling rate of the radar device(s). In some example embodiments, when the display patterns comprise transitions (e.g. movements or intermittent flashing), the time period between flashes may be configured based on a preferred frequency (e.g. preferred by the relevant radar device(s)) of beacon updates such that the display pattern is discernible by the radar devices. The time period may be relatively low in order to allow the radar device(s) to detect the display pattern as a beacon for determining position and/or orientation of the user device. However, lowering the time period may cause power consumption to be higher. In some examples, the display refresh rate and/or time period between flashes may be dynamically adjusted based on the power level of the user device. For example, if the user device is sufficiently charged, and/or connected to a power supply (e.g. being charged), the time period may be configured to be relatively low (e.g. display refresh rate is high), and if the user device is at low power level (e.g. below 20%), the time period may considered to be relatively high (e.g. display refresh rate is low). In an example embodiment, the refresh rate may be updated dynamically using low-temperature polycrystalline oxide at a backplane of a display. The refresh rates may be updated based on one or more conditions, as described above.

In an example embodiment, the display pattern is displayed at the first user device 11, based, at least in part, on the usage of the display by a user. For example, the display patterns may be displayed in such a way that it is not noticeable or disruptive to the user's usage of the user device. For example, if the user is not engaged with a display (or a portion of the display) then display patterns may be displayed at any time. It may be determined that the user is not engaged with a display based on determining the device is display-side down on a surface, in a pocket. Alternatively, or in addition, the display pattern is displayed on the currently unused edge of a curved-edge display, or on the temporarily hidden displays of a foldable or scrollable smartphone. Alternatively, it may be determined that the user is engaged with a display when, for example, a video content is being played at the display, or frequent user interaction (e.g. via touch inputs or voice inputs) is detected. In one example, if it is determined that the user is engaged with the display, the display pattern may be displayed (flashed) at a rate that is sufficiently high so as to be unnoticeable to the user. For example, if the minimum determinable length of display pattern features is sufficiently small, it may be possible to interlace the features at intervals in typical display content without impacting the viewing of the content.

In some example embodiments, the display pattern may be displayed continuously on the user device, for example when the user device is in sleep mode (e.g. user device having always-on capabilities). For example, liquid crystal states of LCD screens may be manipulated to portray display patterns while the display backlight is off, thereby not visually disturbing a user.

In an example embodiment, the display patterns may be embedded within display content of the screen, for example, with spatial variations that may not be noticeable to a user (e.g. unnoticeable to human eyes), while still being detectable by a radar module of the second user device. For example, the display pattern may be a substantially transparent subtractive or additive mask on the display content.

In an example embodiment, the display pattern may comprise an encryption enabling the display pattern to be detectable by an authorized second user device. For example, there may be multiple user devices (e.g. AR devices) having radar capabilities within the vicinity of the first user device (11, 41). In order to prevent unauthorized user devices from being able to determine position and/or orientation of the first user device based on the display pattern, the display pattern may comprise an encryption. An encryption key may be shared (e.g. privately shared in advance) with authorized user device(s) (e.g. user devices intended for conveying the display pattern to, such as the second user device 11, second user device 42, third user device 43 described above). The authorized user device(s) may decode the display pattern into usable data using the encryption key, such that the display pattern may be used for determining position and/or orientation of the first user device, position and/or orientation of the second user device relative to the first user device, or other AR feature information. For example, the display pattern encryption may be implemented by causing display pattern features to flash in a pseudo-noise code that can be decoded into a readable display pattern using the encryption key.

FIG. 6 is an illustration of a first user device, indicated generally by the reference numeral 60, in accordance with an example embodiment. The first user device 60 (similar to the first user device 11, 41) may generate and display a display pattern, such as the display pattern 61. The display pattern 61 may comprise features with spatial variations. For example, the example display pattern 61 comprises pixels forming a white rectangle in the bottom right corner of the display of the first user device 60, and the remaining portion of the display comprises black pixels. The display pattern 61 may therefore be an asymmetric pattern, such that spatial variations within the display pattern enables the display pattern to be detected by a radar device (such as the second user device 13, second user device 42, third user device 43) and enable an orientation or position of the first user device 60 to be determined by the radar device.

FIG. 7 is an illustration of a first user device, indicated generally by the reference numeral 70, in accordance with an example embodiment. The first user device 70 (similar to the first user device 11, 41) may generate and display a display pattern, such as the display pattern 71. The example display pattern 71 is an inverse of the display pattern 61 shown with reference to FIG. 6. For example, the display pattern 71 comprises pixels forming a black rectangle in the bottom right corner of the display of the first user device 70, and the remaining portion of the display comprises white pixels. In one example embodiment, a display pattern (e.g. a temporal display pattern) on a user device may alternate between the display pattern 61 and display pattern 71 periodically (e.g. with a known frequency).

In an example embodiment, the display pattern further comprises features relating to a geometry (e.g. shape, size) of the first user device (11, 41). For example, the display pattern may then be used by a second user device (13, 42, 43) to determine the geometry of the first user device and consequently render AR features that are at least partially based on said geometry. In one example, the information of the features relating to the geometry of the first user device may be encoded in the display pattern by controlling the liquid crystal states around the border of the display of the first user device in a manner that is sufficiently discernible (i.e., the border must be of sufficient size, and exist for a sufficient duration) by the radar module (14) of the second user device.

In an example embodiment, the display pattern, comprising features relating to the geometry of the first user device, displayed by the first user device may be used for determining a level of occlusion between the first user device and the second user device (e.g. radar device). Based on the determined geometry, position, and/or orientation of the first user device, the second user device may render an AR feature corresponding to the first user device, so as to indicate a location of the first user device to a user. For example, in a scenario where the first user device may be misplaced or occluded from the user's sight (e.g. hidden behind furniture, or in an unknown location of a bag), rendering of an AR feature to indicate the location of the first user device (e.g. by making the rendered AR feature visually identifiable) may allow the user to retrieve the first user device.

In an example embodiment, the features relating to the geometry of the first user device, as comprised within the display pattern, may relate to a three dimensional geometry of the first user device, such that the display pattern is detectable by the radar module of the second user device from one or more specified directions. In one example, the discernibility of display pattern features may be limited to a field ahead of the display pattern feature, such that the second user device may only be able to detect the display pattern and consequently determine position and/or orientation of the first user device and the second user device relative to the first user device. For example, a reflected mmWave signal associated with the display feature may only be of sufficient strength within a conical field ahead of the display feature, such that the second user device (e.g. external mmWave radar equipped device) may only discern the entire display pattern when within the intersection of the field of all display pattern features. In one example, if display pattern features are located on both the front and edge of a curved-edge display of the first user device, the display pattern may only be detected by the second user device when the first user device is tilted, and thus the AR features may be rendered by the second user device when the first user device is tilted. In another example, the display pattern comprising features relating to 3D geometry of the first user device may enable the second user device to determine the geometry of the first user device. For example, the determined geometry of the first user device, such as a foldable smartphone, may allow determination of whether the first user device is folded or unfolded, and/or determination of a fold angle of the first user device.

Figure 8:
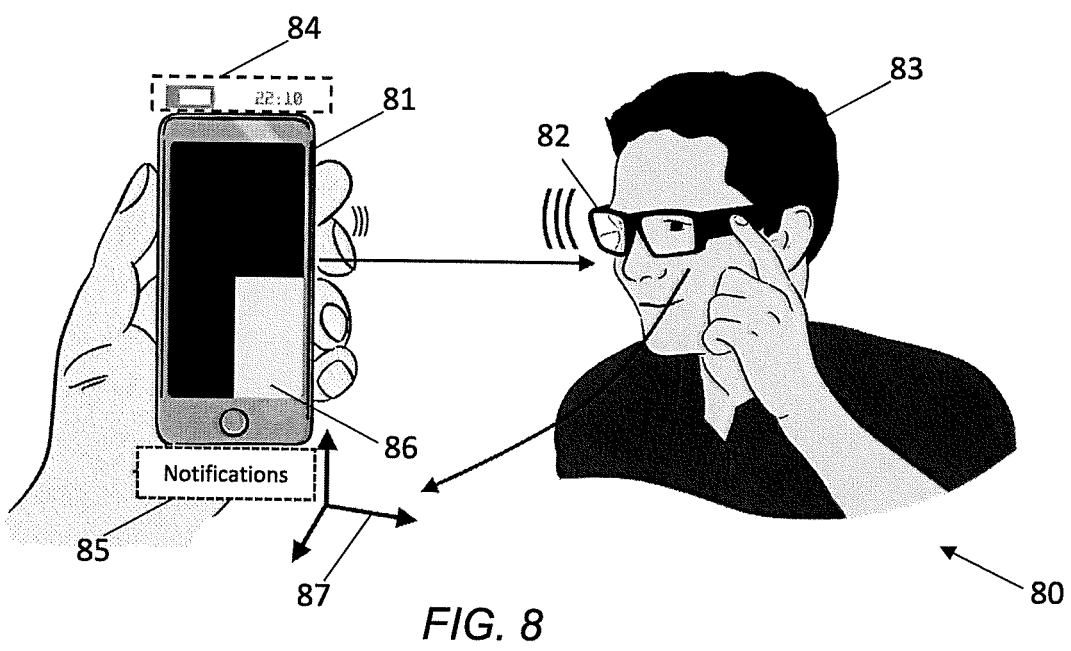
FIG. 8 is a block diagram of a system in accordance with an example embodiment.

FIG. 8 is a block diagram of a system, indicated generally by the reference numeral 80, in accordance with an example embodiment. The system 80 shows a first user device 81 (e.g. similar to first user devices 11, 41), and a second user device 82 (e.g. similar to second user devices 13 and 42, and third user device 43) worn by a user 83. The first user device 81 may display a display pattern 86, which display pattern is detected by the second user device 82 using radar (e.g. mmWave) capabilities. The second user device 82 may then be able to determine (operation 24) position and/or orientation of the first user device 81 and then determine (operation 26) position and/or orientation of the second user device 82 relative to the first user device 81 within the coordinate system 87 of the first user device 81. Based on the determined information, the second user device 82 may configure position and/or orientation of audio-visual content, such as AR features 84 and 85, and render said AR features 84 and 85 at a position relative to the first user device 81. For example, the second user device 82 may not comprise a front facing camera (e.g. RGB camera) for determining the location, position or orientation of the first user device 81. The second user device 82 may nevertheless determine the position and/or orientation of the first user device 81 using the display pattern, and may render the AR features 84 and 85 in proximity to the first user device 81 accordingly.

Figure 9:
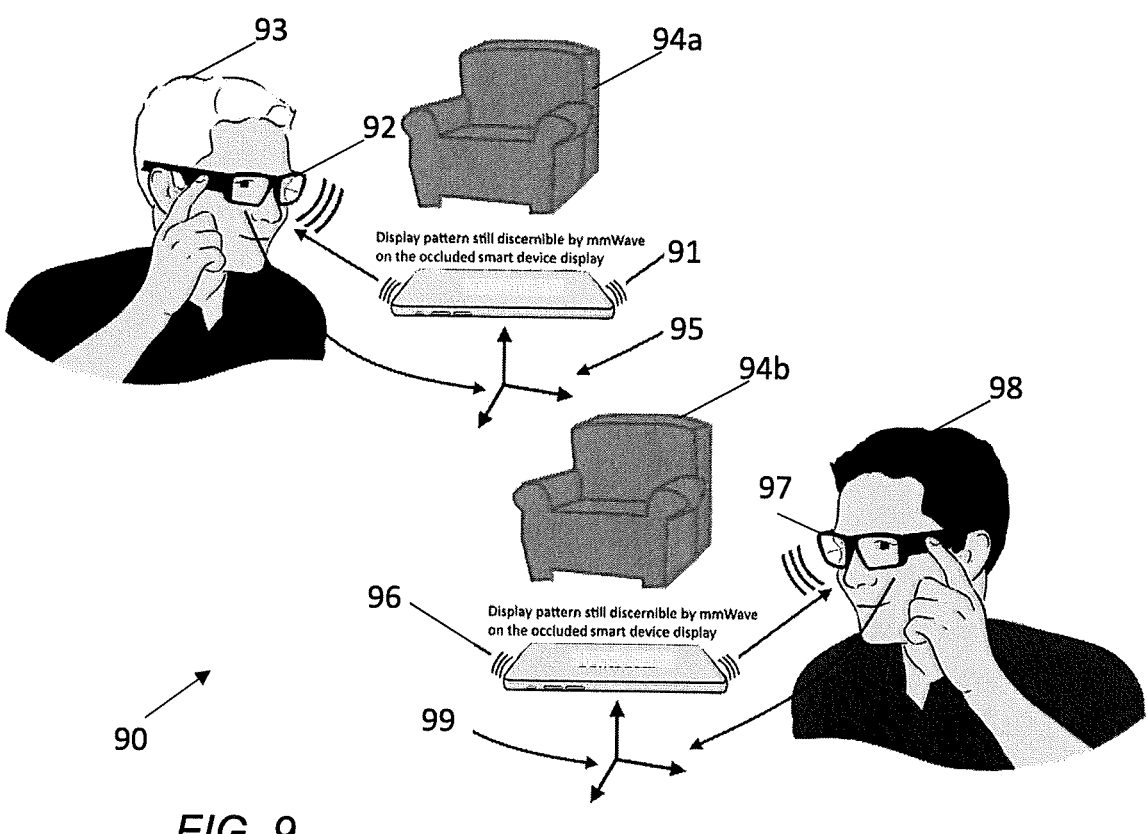
FIG. 9 is a block diagram of a system in accordance with an example embodiment.

FIG. 9 is a block diagram of a system, indicated generally by the reference numeral 90, in accordance with an example embodiment. System 90 comprises a first user device 91 (similar to first user devices 11, 41, 81), and a second user device 92 (similar to second user devices 13, 42, 82, third user device 43) worn by a first user 93. System 90 further comprises a third user device 96 (similar to first user devices 11, 41, 81), and a fourth user device 97 worn by a second user 98 (similar to second user devices 13, 42, 82, third user device 43). The second user device 92 and fourth user device 97 may have radar capabilities and may have AR, VR and/or MR capabilities.

One or both of the first user device 91 and third user device 96 may generate display pattern(s) to enable one or both of the second user device 92 and fourth user device 97 to determine position and/or orientation of the respective first user device 91 and third user device 96, and to determine position and/or orientation of the respective second user device 92 and fourth user device 97 relative to one or both of the first user device 91 and third user device 96.

In an example embodiment, the second user device 92 may detect display pattern(s) displayed by the first user device 91, and determine position and/or orientation of the first user device 91 and determine position and/or orientation of the second user device 92 relative to the first user device 91 within the coordinate system 95 of the first user device 91. The second user device 92 may further detect display pattern(s) displayed by the third user device 96, and determine position and/or orientation of the third user device 96 and determine position and/or orientation of the second user device 92 relative to the third user device 96 within the coordinate system 99 of the third user device 96. In such a way, the second user device 92 may determine its own position and/or orientation (self-localization) with higher accuracy, as it is determined based on relative positions from multiple devices (first and third user devices 91 and 96).

In an example embodiment, determining the position and/or orientation of the second user device 92 relative to each of the first user device 91 and third user device 96 may allow the second user device 92 to extend an area in which audio-visual content (e.g. AR features) are rendered. As such, the second user device 92 may render a first AR feature 94a to appear to be associated with the first user device 91, and may further render a second AR feature 94b to appear to be associated with the third user device 96. This may be beneficial, for example, for rendering the AR feature 94b in a suitable position for viewing, hearing, or interaction by the second user 98, in the event that the fourth user device 97 is unable to detect a display pattern displayed by the third user device 96, or unable to determine position and/or orientation of the third user device 96 and/or position and/or orientation of the fourth user device 97 relative to the third user device 96.

In an example embodiment, the second user device 92 may detect display pattern(s) displayed by the first user device 91, and determine position and/or orientation of the first user device 91 and determine position and/or orientation of the second user device 92 relative to the first user device 91 within the coordinate system 95 of the first user device 91. The display pattern displayed at the first user device 91 (e.g. first user 93 being the user of the first user device 91) may only be discernible (e.g. by encryption) by the second user device 92 (e.g. as an authorized user device belonging to the same first user 93). Similarly, the fourth user device 97 may detect display pattern(s) displayed by the third user device 96, and determine position and/or orientation of the third user device 96 and determine position and/or orientation of the fourth user device 97 relative to the third user device 96 within the coordinate system 99 of the third user device 96. The display pattern displayed at the third user device 96 (e.g. second user 98 being the user of the third user device 96) may only be discernible (e.g. by encryption) by the fourth user device 97 (e.g. as an authorized user device belonging to the same second user 98). As such, even if there are multiple radar devices in close proximity of the user device (91, 96), the display pattern may not be discernible to all of the multiple devices (may only be discernible to authorized devices).

In an example embodiment, the second user device 92 may determine that the first user 93 is a user of both the second user device 92 and the first user device 91, and/or may determine that the user 93 is in closer proximity to the first user device 91 compared to the third user device 96. Based on this determination, the second user device 92 may render AR feature 94a in close proximity to the first user device 91 (e.g. rather than rendering in close proximity to the third user device 96), so that the AR feature 94a is suitably visible to the first user 93. Similarly, the fourth user device 97 may determine that the second user 98 is a user of both the fourth user device 97 and the third user device 96, and/or may determine that the second user 98 is in closer proximity to the third user device 96 compared to the first user device 91. Based on this determination, the fourth user device 97 may render AR feature 94b in close proximity to the third user device 96 (e.g. rather than rendering in close proximity to the first user device 91).

Figure 10:
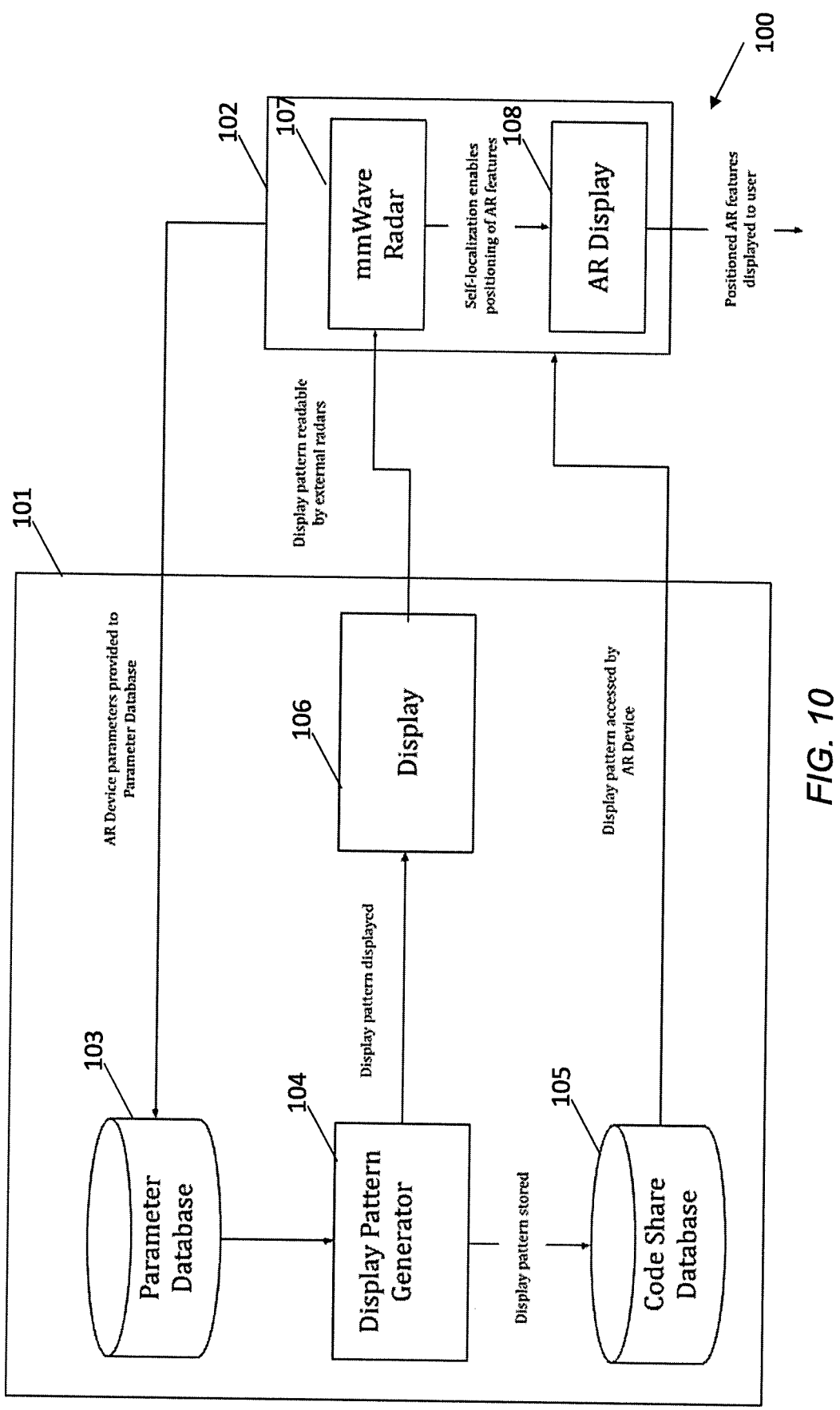
FIG. 10 is a block diagram of a system in accordance with an example embodiment.

FIG. 10 is a block diagram of a system, indicated generally by a reference numeral 100, in accordance with an example embodiment. The system 100 comprises a first user device 101 and a second user device 102 (e.g. AR device). The first user device 101 may be a smart device, such as a smartphone, tablet, smartwatch, or the like, or a device that is generally stationary, such as a smart television, or advertising display. The first user device 101 may comprise at least one display 106, such as an OLED or LCD screen that may be a controllable display. The first user device 101 may further comprise a parameter database 103, a display pattern generating module 104, and a code share database 105.

In one example embodiment, the parameter database 103 may store relevant hardware and capability information about the display 106 and/or any external radar devices, such as second user device 102. The parameter database 103 may also store data pertaining to AR features (e.g. audio-visual content to be rendered), such as position, orientation, or content of AR features to be rendered (e.g. by the second user device 102)

In one example embodiment, the display pattern generator module 104 may generate the display pattern to enable the second user device 102 to perform localization measurements (e.g. determine position and/or orientation) of the first user device 101, as well as determine position and/or orientation of the second user device 102 relative to the first user device 101. The display pattern may be generated based, at least partially, on parameters stored in the parameter database 103 (e.g. parameters associated with the display 106, second user device 102, or AR features to be rendered).

In one example embodiment, the code share database 105 may be within the first user device 101, or may be external to the first user device 101. In some examples, the code share database 105 may be accessed by the first user device 101 as well as external devices, such as the second user device 102, for sharing display patterns.

In one example embodiment, the second user device 102 may be equipped with a radar module 107 (e.g. FMCW mmWave (30 GHz-300 GHz) radar) and an AR display module 108. The second user device 102 may provide parameters to the first user device 101 for generation of display pattern(s). The second user device 102 may further access, using the radar module 107, display patterns, and may perform localization measurements (e.g. determining orientation and/or position) of the first user device 101 based on detected display patterns as well as determine position and/or orientation of the second user device 102 relative to the first user device 101. The AR display module 108 may render visual and/or audio content (e.g. AR features) that are positioned and/or oriented based on the localization measurements of the first user device 101 and second user device 102 relative to the first user device 101.

FIG. 11 is a flowchart of an algorithm, indicated generally by the reference numeral no, in accordance with an example embodiment. FIG. 11 may be viewed in conjunction with FIG. 10 for better understanding.

The algorithm no starts with operation in, where a user of the first user device 101 may initiate a program on the first user device 101, which program may initiate generation and/or display of a display pattern that is detectable by a radar device, such as the second user device 102.

Next, at operation 112, the parameters database 103 may be populated with relevant information, for example, comprising information regarding the display 106, second user device 102, transient information, and/or AR features.

At operation 113, the display pattern generator module 104 may receive an input from the parameter database 103, the input comprising at least some information stored in the parameter database 103. Based on the received input, the display pattern generator module 104 may generate and display a display pattern on the display 106. The display pattern may comprise features having spatial variations that may allow orientation and/or position of the first user device 101 to be determined by the second user device 102. The display pattern may be of sufficient size and/or duration so as to enable the second user device 102 to accurately perform localization measurements (e.g. determine position, orientation, size, of the first user device 101, and position/orientation of the second user device 102 relative to the first user device 101).

At operation 114, the display pattern generator module 104 may further generate and display a display pattern relating to AR features to be rendered on the display 106. The display pattern generated and displayed at operation 114 may be same as that of operation 114, or may be a different display pattern. Alternatively, or in addition, the display patterns generated and displayed at operations 113 and 114 may combine to form a spatial and temporal display pattern (e.g. series of changing display patterns, or a display pattern moving within the screen based on a certain frequency).

At operation 115, the display pattern may be stored in the code share database 95. The radar device 92 may be able to access the stored display pattern from the code share database. Operation 115 may be optional.

At operation 116, a training phase of a model (e.g. a machine learning model) may be performed, for example, jointly by the first user device 101 and the second user device 102. The training phase may comprise moving the first user device 101 and/or the second user device 102 through a plurality of known positions and orientations. The known positions and orientations are recorded, and may be associated with a set of recorded mmWave radar responses. The recorded mmWave radar responses may be initially processed as a series of spectrograms. The trained model may then be associated with the display pattern.

In an example embodiment, in the event that the model has already been trained (e.g. such that the second user device 102 has already been trained to recognize display patterns from the first user device 101), the operation 116 may be omitted. The second user device 102 may then may only access the display pattern from the code share database 105 without having to perform the training phase.

At operation 117, the second user device 102 may perform localization measurements based on the display pattern displayed on the first user device 101. The localization measurements may be performed continuously (e.g. for detecting gestures performed with the first user device 101, or tracking movements of the first user device 102 for rendering AR features accordingly). The second user device 102 may use the trained model to determine the orientation and/or position of the first user device 101, At operation 118, the second user device 102 may configure and render AR features with position and/or orientation relative to the first user device 101 (e.g. AR features rendered within a field of view of the second user device 102) based on the localization measurements (e.g. may further use the trained model).

Figure 12:
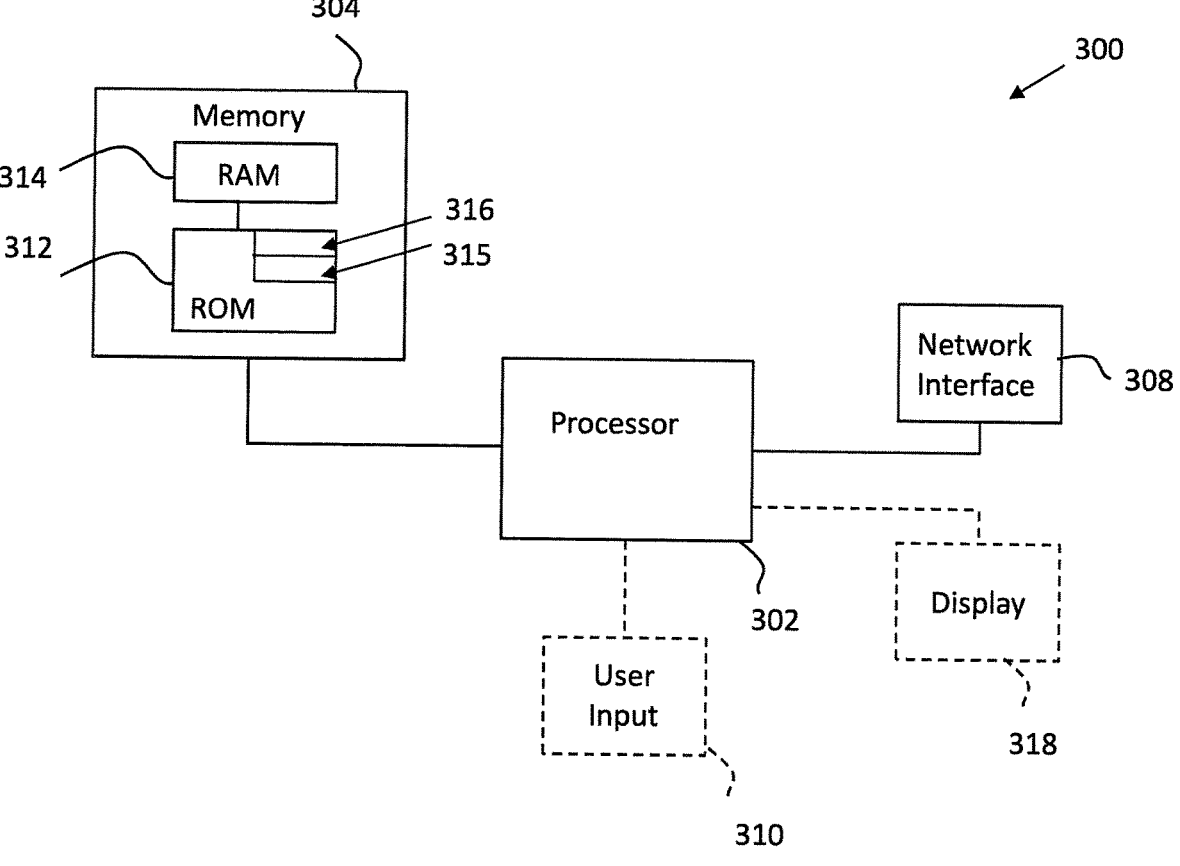
FIG. 12 is a block diagram of components of a system in accordance with an example embodiment.

For completeness, FIG. 12 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain computer program code which, when executed by the processor implements aspects of the algorithms 20, 30, 50, and 110, described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of micro-controllers, a processor, or a plurality of processors.

The processing system 300 may be a standalone com-puter, a server, a console, or a network thereof. The pro-cessing system 300 and needed structural parts may be all inside device/apparatus such as IoT device/apparatus i.e. embedded to very small size In some example embodiments, the processing system 300 may also be associated with external software applica-tions. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 13:
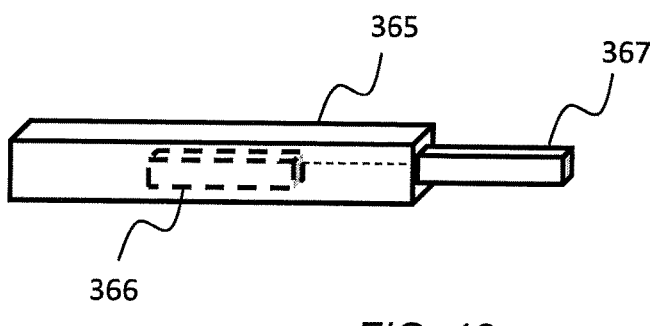
FIG. 13 shows an example of tangible media for storing computer-readable code which when run by a computer may perform methods according to example embodiments described above.

FIG. 13 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/ information which data/information can be exchanged between devices/apparatus/network.

Embodiments of the present invention may be imple-mented in software, hardware, application logic or a com-bination of software, hardware and application logic. The software, application logic and/or hardware may reside on memory, or any computer media. In an example embodi-ment, the application logic, software or an instruction set is maintained on any one of various conventional computer-readable media. In the context of this document, a "memory" or "computer-readable medium" may be any non-transitory media or means that can contain, store, com-municate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/ multi-processor architectures and sequencers/parallel archi-tectures, but also specialised circuits such as field program-mable gate arrays FPGA, application specify circuits ASIC, signal processing devices/apparatus and other devices/appa-ratus. References to computer program, instructions, code etc. should be understood to express software for a program-mable processor firmware such as the programmable content of a hardware device/apparatus as instructions for a processor or configured or configuration settings for a fixed func-tion device/apparatus, gate array, programmable logic device/apparatus, etc.

As used in this application, the term "circuitry" refers to all of the following: (a) hardware-only circuit implementa-tions (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 2, 3, 5, and 11, are examples only and that various operations depicted therein may be omitted, reordered and/ or combined.

It will be appreciated that the above described example embodiments are purely illustrative and are not limiting on the scope of the invention. Other variations and modifica-tions will be apparent to persons skilled in the art upon reading the present specification.

Moreover, the disclosure of the present application should be understood to include any novel features or any novel combination of features either explicitly or implicitly dis-closed herein or any generalization thereof and during the prosecution of the present application or of any application derived therefrom, new claims may be formulated to cover any such features and/or combination of such features.

The invention claimed is:

1. An apparatus, comprising:

at least one processor; and at least one non-transitory memory storing instructions that, when executed with the at least one processor; cause the apparatus to perform:

detecting, at a second user device, one or more display patterns displayed at a display of a first user device, wherein the one or more display patterns comprise features with spatial variations configured to be detected with a radar module of the second user device;

determining at least one of an orientation, position, or size of the first user device based, at least in part, on the one or more display patterns; and determining at least one of an orientation or position of the second user device relative to the first user device within a coordinate system of the first user device.

2. An apparatus as claimed in claim 1, wherein the instructions, when executed with the at least one processor, cause the apparatus to perform configuring at least one of a position, orientation, or size of at least one of visual or audio data based, at least in part, on the determined orientation or position of the second user device relative to the first user device, wherein the one or more display patterns further comprise inertial data associated with the first user device.

3. An apparatus as claimed in claim 2, wherein the instructions, when executed with the at least one processor, cause the apparatus to perform rendering at least one of visual or audio data according to the configured position, orientation, or size.

4. An apparatus as claimed in claim 1, wherein the display pattern comprises an encryption enabling the instructions, when executed with the at least one processor, to cause the display pattern to be detectable with an authorized second user device.

5. An apparatus as claimed in claim 1, wherein the display pattern comprises features associated with one or more virtual reality, augmented reality, or mixed reality features.

6. An apparatus as claimed in claim 1, wherein the display pattern further comprises one or more features relating to a geometry of the first user device.

7. An apparatus as claimed in claim 6, wherein the one or more features relating to the geometry of the first user device relate to a three dimensional geometry of the first user device, such that the instructions, when executed with the at least one processor, cause the display pattern to be detectable with the radar module of the second user device from one or more specified directions.

8. An apparatus as claimed in claim 1, wherein the display pattern comprises at least one of:

one or more predetermined shapes displayed in a non-symmetrical manner;

one or more predetermined shapes displayed with a predetermined spatial pattern; or transitioning between a plurality of predetermined patterns.

9. An apparatus, comprising:

at least one processor; and at least one non-transitory memory storing instructions that, when executed with the at least one processor; cause the apparatus to perform:

generating, at a first user device, a display pattern comprising features with spatial variations, wherein the spatial variations are configured to enable determination, with a radar module of a second user device, of at least one of an orientation, position, or size of a first user device.

10. A method, comprising:

detecting, at a second user device, one or more display patterns displayed at a display of a first user device, wherein the one or more display patterns comprise features with spatial variations configured to be detected with a radar module of the second user device;

determining at least one of an orientation, position, or size of the first user device based, at least in part, on the one or more display patterns; and determining at least one of an orientation or position of the second user device relative to the first user device within a coordinate system of the first user device.

11. A non-transitory program storage device readable with an apparatus, tangibly embodying a program of instructions executable with the apparatus to perform:

the method of claim 10.

12. A method, comprising:

generating, at a first user device, a display pattern comprising features with spatial variations, wherein the spatial variations are configured to enable determination, with a radar module of a second user device, of at least one of an orientation, position, or size of a first user device.

13. A non-transitory program storage device readable with an apparatus, tangibly embodying a program of instructions executable with the apparatus to perform the method of claim 12.

* * * * *